Rolf Hübner
INVENTOR.
BY Karl F. Ross
AGENT

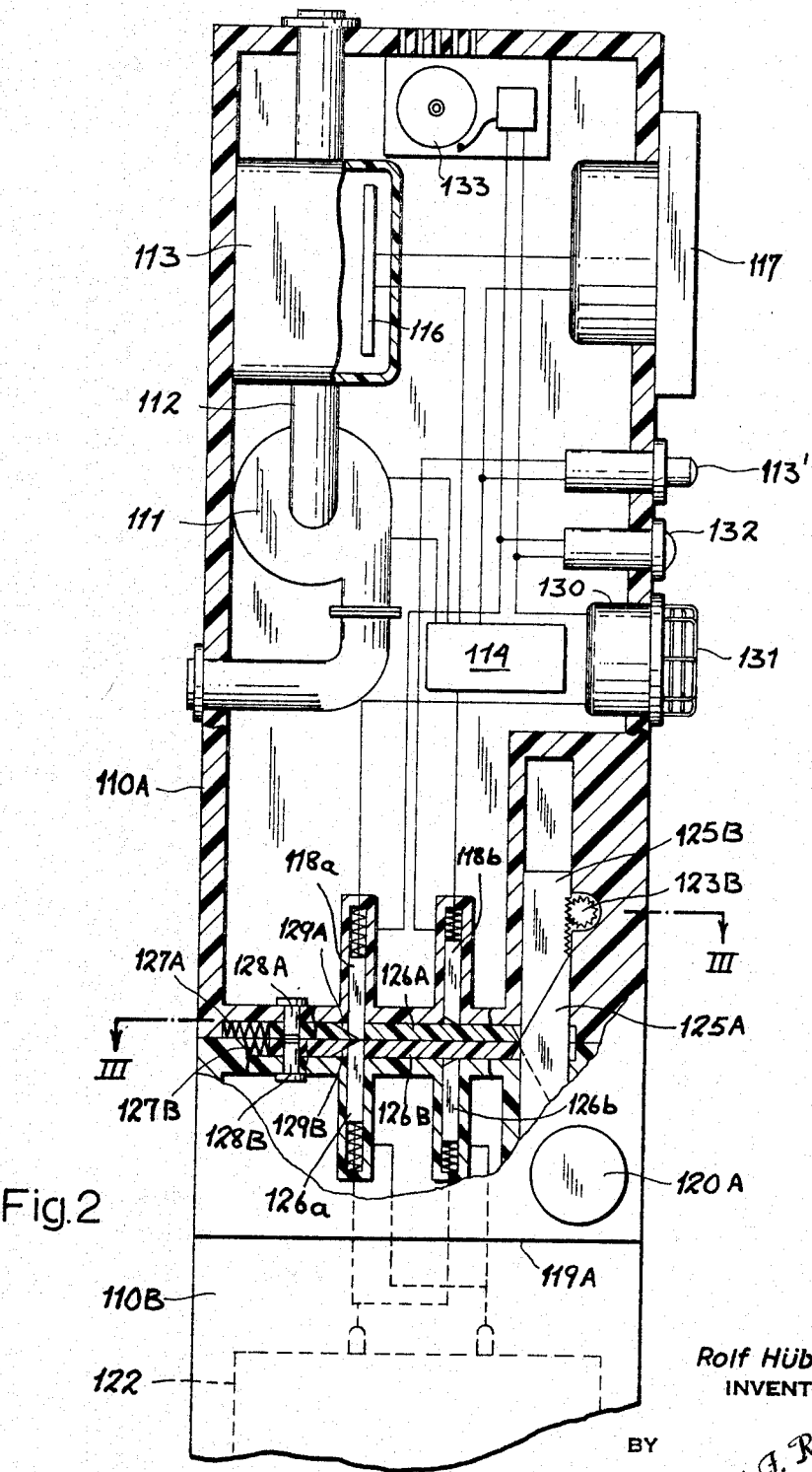

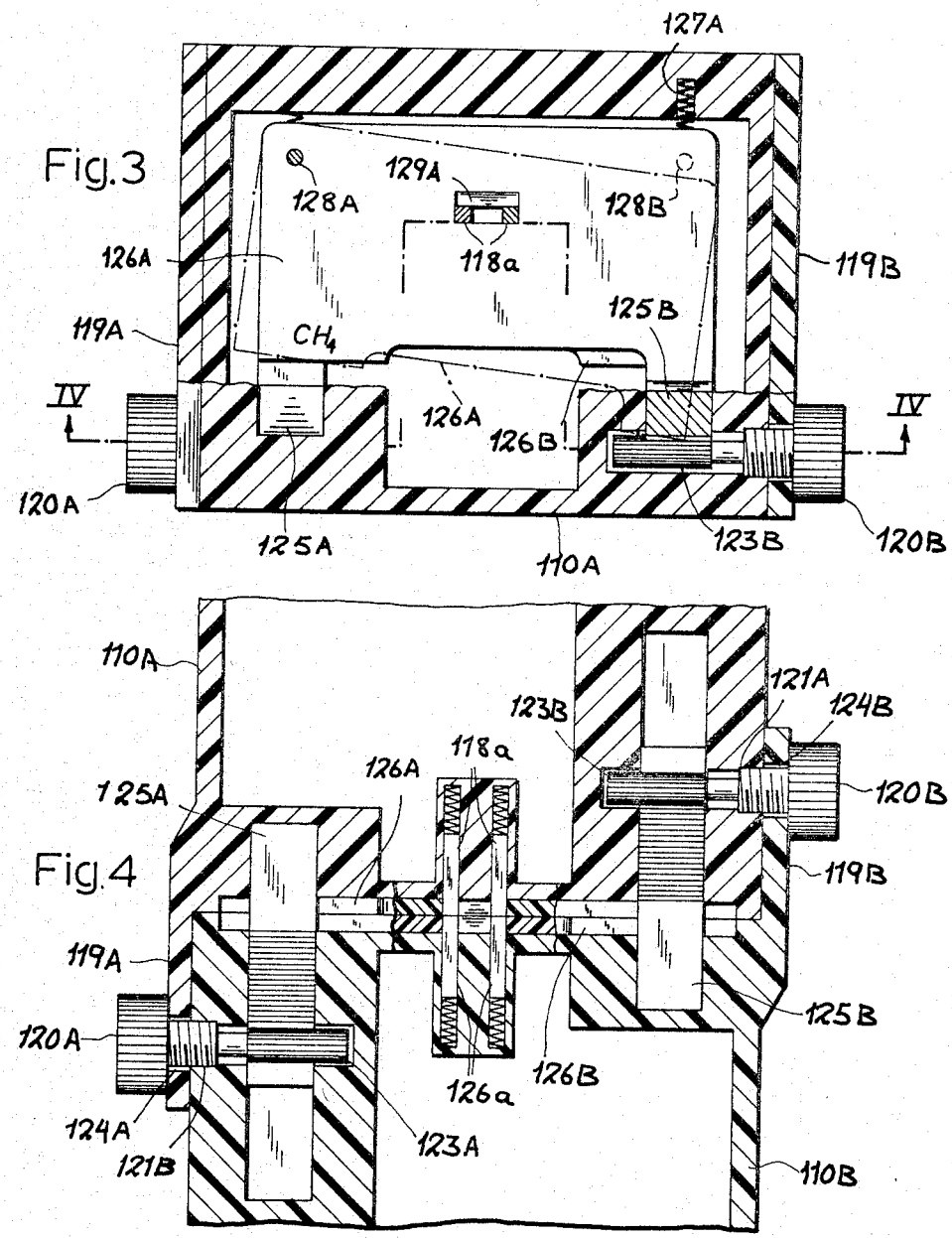

United States Patent Office 3,276,241
Patented Oct. 4, 1966

3,276,241
GAS ANALYZER WITH DETACHABLE
POWER PACK
Rolf Hübner, Gabelsbergerstrasse 31,
Dortmund, Germany
Filed Dec. 7, 1964, Ser. No. 416,653
Claims priority, application Germany, Dec. 5, 1963,
H 46,921; Feb. 5, 1964, H 51,592; Feb. 8, 1964,
H 47,560
5 Claims. (Cl. 73—23)

My present invention relates to a portable gas analyzer adapted to be used in mines and at similar locations for the detection and measurement of noxious constituents in the ambient atmosphere. Such analyzers have been disclosed, for example, in my copending application Ser. No. 412,120, filed November 18, 1964 now U.S. Patent No. 3,242,715 issued March 29, 1966, and in my application Ser. No. 416,655, filed concurrently with the present application. Instruments of this character generally include one or more testing circuits with sensors for detecting certain physical properties of a gas sample admitted into a measuring chamber and/or passed through a tubular probe, such as the thermal conductivity or the electrical resistance or capacitance of the gas, along with one or more indicators responsive to the output of the sensors; in addition, as disclosed in my application Ser. No. 416,655 of even date, a pump may be provided for aspirating a sample of ambient gas into the test passage just before or during the taking of readings. Finally, a power supply is needed to energize all these elements, this power supply usually taking the form of a battery (rechargeable or not) housed within the instrument itself.

In view of the limited storage capacity of electrical batteries suitable for the purpose described, the instrument (when used underground) must be frequently returned to the surface for recharging or replacement of its power pack. This is particularly true where weight and volume of the instrument are important considerations limiting the size and therefore the energy content of the battery. In practice, therefore, it is often necessary to equip each crew of workmen entering the mine with a complete set of instruments which must be taken out again at the end of their shift. Such a procedure requires a relatively large stock of instruments, especially if several types must be used concurrently in order to test for different atmospheric constituents. Moreover, the carrying of the instruments into and out of the mine makes it more difficult for the miners to transport other needed equipment.

It is therefore the general object of my present invention to provide an instrument of this type which, notwithstanding the aforestated limitations inherent in the nature of the power supply, does not have to be transported in its entirety from its place of use to a supply station whenever the associated power pack is exhausted or severely depleted.

Another object of this invention is to provide an instrument of this character which, while inherently designed to perform a variety of tests, is controllable through the choice of an associated power pack to carry out only a selected type of tests so as to minimize the risk of confusion.

In order to realize the aforestated objects, I propose in accordance with this invention to divide the instrument housing into a plurality of separable portions each containing one or more of the above-identified elements, i.e. the sensors or testing devices proper, the indicator or indicators therefor and the power supply. Although, in principle, a separate housing portion may be provided for each of these components, it will usually be sufficient to assemble the testing and indicating means in a first housing portion and to provide a second housing portion for the power supply. The two (or more) housing portions are provided with mating contacts which, upon their joinder, connect the testing and indicating means through the power supply. With an instrument of this type it is no longer necessary to transport the complete unit to a checking and/or charging station since only the portion containing the power supply will have to be reconditioned from time to time. Thus, the main part of the instrument can be left on location, to be passed on from one shift to the next, for attachment to a battery-carrying module when and as needed. In accordance with a more particular feature of my invention, these modules or second housing portions may be interchangeably designed to energize different circuits of the test assembly; thus, for example, one type of module could serve for the measurement of the concentration of a particular gas, upon closure of a switch as described in my application Ser. No. 416,655 of even date, whereas another type of module might establish an alarm circuit to be tripped whenever such concentration reaches a predetermined danger point. Again, if desired, the modules could be divided into different classes for the testing of different types of gas, e.g. methane, carbon monoxide or carbon dioxide. In this way a given test assembly may be successively fitted with different power-pack modules for the performance of the tasks for which these modules are specifically designed, thereby not only insuring the orderly sequence of the several testing operations but also limiting the extent of use of each power pack during a shift so that electric energy is conserved and the modules will remain operative for longer periods.

FIG. 2 is a view similar to FIG. 1, but taken at right angles thereto, illustrating a modified embodiment;

FIG. 3 is a cross-sectional view taken on the line III—III of FIG. 2;

FIG. 4 is a fragmentary sectional elevation taken on line IV—IV of FIG. 3;

FIG. 5 is a plan view of a modified cover plate adapted to be used in the embodiment of FIGS. 2–4;

Figure 1:
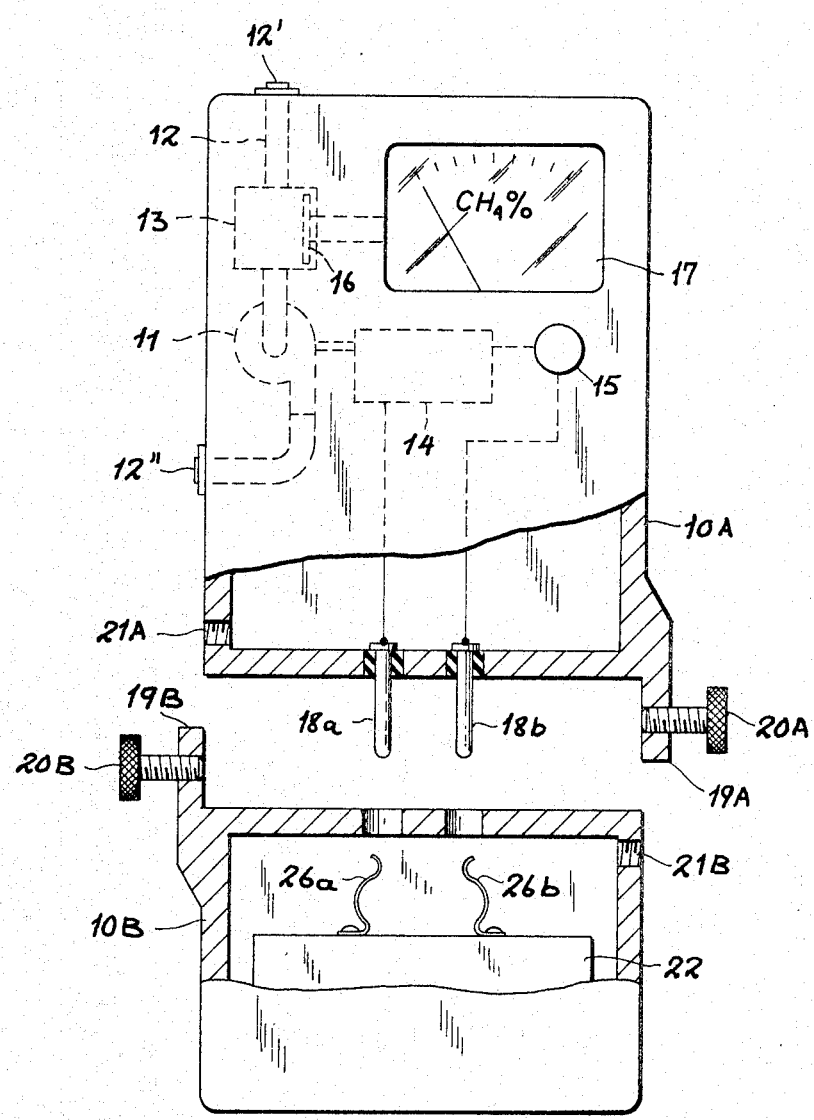
FIG. 1 is an elevational view (parts broken away) of an instrument according to the invention with a two-part housing.

Reference will first be made to FIG 1 which shows a portable gas analyzer comprising a first housing portion 10A and a second housing portion 10B. Housing portion 10A accommodates a testing unit for ambient gas, this unit including a pump 11 for aspirating an atmospheric sample through the inlet 12' of a passage 12 into a measuring chamber 13 and subsequently expelling the gas through the outlet 12" of the passage; the motor of pump 11, not illustrated separately, is electrically energizable under the control of a timing circuit 14 upon the actuation of a pushbutton 15. A sensor 16 in chamber 13 operates a meter 17, in the actuated condition of pushbutton 15, to indicate the percentage of a noxious constituent (e.g. methane) in the tested sample and therefore in the surrounding atmosphere.

The energizing circuit for the elements just described terminates at a pair of contact pins 18a, 18b projecting from the lower end of housing portion 10A. A boss 19A depending from this housing portion carries a knurled screw 20A engageable in a complementarily threaded bore 21B of housing portion 10B, the latter also having a boss 19B with a knurled screw 20B engageable with a mating bore 21A in housing 10A. An electric battery 22 in housing portion 10B has terminals connected to respective contact springs 26a, 26b positioned for co-operation with the contact pins 18a, 18b upon assembling of the two housing portions by means of the fasteners 20A and 20B.

The operation of the instrument shown in FIG. 1 will be readily apparent since, upon interconnection of the two housing portions, the circuit to pump 11, sensor 16 and meter 17 will be extended to battery 22 and will be closed upon depression of pushbutton 15.

The instrument shown in FIGS. 2–4 has a first housing portion 110A and a second housing portion 110B interconnected by means of knurled screws 120A, 120B threadedly engaging in mating bores 121B, 121A of the respectively opposite housing portion. Each of these pins is rigid with a respective pinion 123A, 123B which, upon its insertion into the opposite housing portion through a hole 124A or 124B in boss 119A or 119B and through the corresponding bore 121B or 121A, meshes with a respective rack 125B or 125A in that opposite housing portion. When the screw is then turned to clamp the two housing portions to each other, the rack 125A or 125B is longitudinally displaced toward the other housing portion so as cammingly to engage a cover plate 126A or 126B normally overlying respective terminal pins in that housing portion, i.e. pins 118a, 118b in the case of housing portion 110A and terminal pins 126a, 126b in the case of housing portion 110B. These terminal pins are spring-loaded so as to tend to move outwardly toward each other, each pin 118a, 118b confronting a respective pin 126a, 126b for conductive contact therewith upon the withdrawal of the overlying cover plates 126A and 126B under the camming action of the corresponding racks 125A and 125B. These cover plates are, however, so designed as to expose only some of the associated terminal pins upon being cammed aside by these racks 125A, 125B against the force of respective biasing springs 127A, 127B, the two plates being pivotable about studs 128A, 128B by which they are removably held onto the associated housing portions. Thus, I have indicated in dot-dash lines in FIG. 3 the position occupied by the plate 126A upon the removal of lower housing portion 110B, a cutout 129A in that plate being then offset from the pins 118a so that these pins are held withdrawn, having been cammed into their retracted position by a beveled edge of the slot 129A upon the displacement of plate 126A under the control of spring 127A. Slot 129A and a corresponding cutout 129B in plate 126B are so positioned that only the pin pairs 118a and 126a can contact one another in the assembled state of the instrument; the pin pairs 118b and 126b are always held separated by the plates 126A and 126B. In FIG. 5, however, I have shown an alternate cover plate 126C which could be substituted, together with a mirror-symmetrical companion plate, for the plates 126A, 126B so that a cutout 129C thereof would expose the pin pairs 118b, 126b, in lieu of the pin pairs 118a, 126a, when the housing portions 110A, 110B are interconnected.

In the specific embodiment shown in FIG. 2, the testing unit in housing portion 110A includes an electric suction pump 111 disposed in a passage 112 beyond a measuring chamber 113, a sensor (e.g. of the thermoelectric type) 116 in that chamber, a timing circuit 114, a meter 117 for the output of sensor 116, a pushbuttom 113' for the actuation of pump 111, sensor 116 and indicator 117 under the control of timer 114, another sensor 130 (e.g. of the electrostatic type) positioned in an apertured envelope 131 so as to measure the conductivity of the ambient atmosphere, and a visual and audible alarm system including a lamp 132 and a bell 133 connected in parallel across sensor 130 in order to respond to a signal indicating a dangerous concentration of noxious gases. The alarm circuit 131, 132, 133 is energizable via the pins 118a so as to be connected to battery 122 in housing portion 110B via pins 126a in the assembled position of the instrument when using the cover plates 126A and 126B; at the same time the testing unit including timer 114 will be cut off so as not to be operable by its pushbutton 113'. Conversely, if plates such as 126C were substituted, the timer-controlled testing unit would become operative and the alarm system would be deactivated.

It will be understood that one of the plates 126A, 126B could be omitted and that in such case, with a cover plate or shield present only on the power-pack module represented by housing portion 110B, such modules could be provided with different types of cover plates so that either the testing circuit or the alarm circuit will operate, depending on which type of module has been attached. Naturally, some modules could also be unshielded so that both circuits would be rendered effective thereby.

Figure 6:
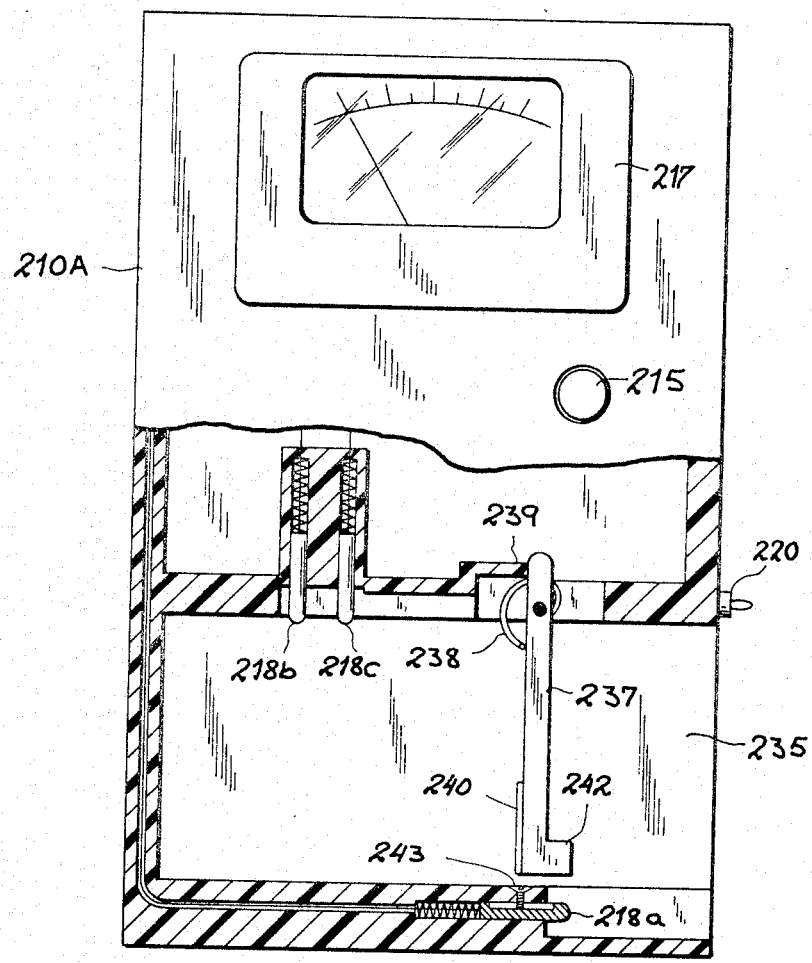
FIG. 6 is a view generally similar to FIG. 1, illustrating the testing assembly of still another embodiment.
Figure 7:
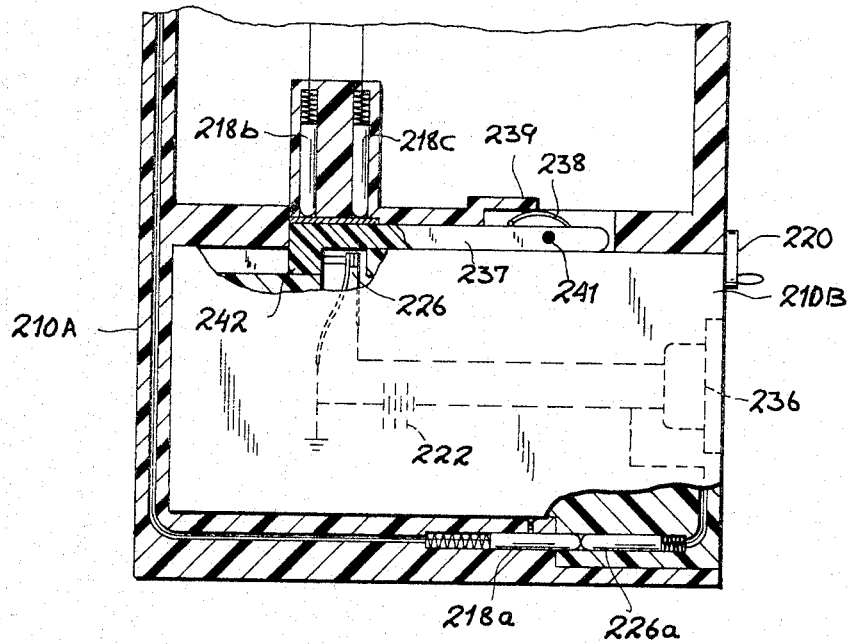
FIG. 7 is a view similar to FIG. 6, illustrating the complete instrument with the power-pack module in place.
Figure 8:
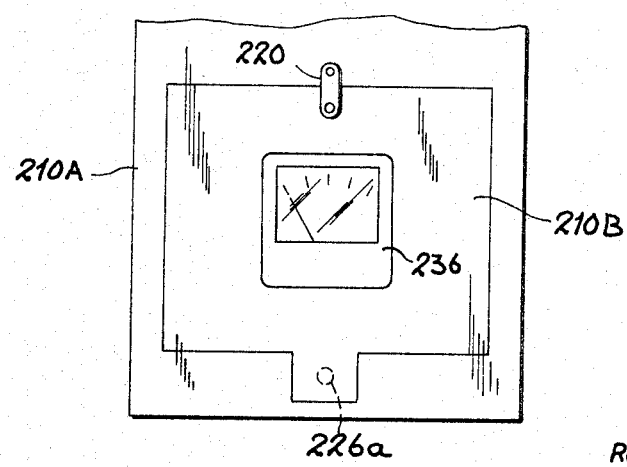
FIG. 8 is a fragmentary side-elevational view of the assembly shown in FIG. 7.

In FIGS. 6–8 I have illustrated an instrument of the same general type with a housing portion 210A for the testing and indicating means of which here only a pushbutton 215 and a meter 217 have been shown; this housing portion is recessed to form a laterally open compartment 235 adapted to receive a complementary housing portion or module 210B. The latter includes a battery 222, represented diagrammatically in FIG. 7, as well as an indicator 236 adapted to show the state of charge of that battery.

The open side of compartment 235 is normally obstructed in the absence of module 210B by a swingable shield plate 237 urged by a spring 238 against abutments 239. Housing portion 210A includes several spring-loaded terminal pins 218a, 218b, 218c of which the first one is positioned for engagement by a confronting spring-loaded terminal pin 226a in housing portion 210B; pins 218b, 218c are positioned next to each other for short-circuiting by a contact layer 240 on shield plate 237 when the latter is swung about its pivot 241 into a withdrawn position by the inner end of module 210B upon insertion of the latter into compartment 235. Suitable fastening means, such as a latch 220, may be provided to hold the housing portion 210B in position against the force of the loading springs of the pins 218a, 226a and other pins, not shown, which may be similarly interengaged. A further set of contacts 226 are positioned for closure by a shoulder 242 on plate 237 when the latter is retracted, as shown in FIG. 7.

FIGS. 6 and 7 also illustrate a retaining screw 243 adapted to limit the extent to which pin 218a may be advanced by its spring; similar retaining means may of course be provided for all the other terminal pins of this and the preceding embodiments.

The short-circuiting of pins 218b and 218c may be used to complete an internal connection within the testing and measuring unit of housing portion 210A; contacts 226, when closed, are here shown to connect the charge indicator 236 across its power supply 222. The negative terminal of this power supply is connected to the testing circuit through contacting pins 226a and 218a; the return connection to the positive terminal may be by way of a common ground, as illustrated diagrammatically, or through other contact pins.

The instruments described and illustrated may be modified in various ways without departing from the spirit and scope of my invention as defined in the appended claims.

I claim:

1. In a portable gas analyzer comprising a first housing portion provided with a diversity of test circuits for atmospheric constituents and further provided with indicating means in said test circuits for registering the presence of a predetermined constituent in a sample of ambient gas to be analyzed by a selected test circuit, said test circuits being provided with individual supply terminals, the combination therewith of:

a second housing portion detachable secured to said first housing portion;

a power supply for said test circuits in said second portion; and contact means on said second portion engageable with certain of said supply terminals upon joinder of said portions for connecting a selected test circuit across said power supply, said contact means comprising a plurality of mating terminals respectively aligned with said supply terminals, at least one of said housing portions being provided with shield means effective upon separation of said portions for rendering the respective terminals inaccessible, said shield means comprising a movable cover plate on said one of said portions normally overlying all the terminals thereof, the other of said portions being provided with abutment means for displacing said cover plate in a manner exposing at least certain of the overlain terminals upon joinder of said portions.

2. The combination defined in claim 1 wherein said cover plate and said abutment means are provided with co-operating camming surfaces.

3. The combination defined in claim 1, further including fastening means for locking said portions in their interconnected position, and abutment means being displaceable by said fastening means.

4. The combination defined in claim 3 wherein said abutment means comprises a longitudinally movable rack, said fastening means including a connecting bolt and a pinion coupled with said bolt, said pinion meshing with said rack.

5. The combination defined in claim 1 wherein said cover plate is removably mounted in said one of said portions for exchange against another cover plate shaped to expose other of said overlying terminals upon joinder of said portions.

References Cited by the Examiner

UNITED STATES PATENTS

| | | | |
|---|---|---|---|
| 1,111,406 | 9/1914 | Sargent | 339—43 |
| 2,546,273 | 3/1951 | Poole | 23—255 |

OTHER REFERENCES

M.S.A. Carbon Monoxide Indicator, 4 pages.

RICHARD C. QUEISSER, *Primary Examiner.*

J. FISHER, *Assistant Examiner.*